US010040691B2

United States Patent
Ostuni et al.

(10) Patent No.: US 10,040,691 B2
(45) Date of Patent: Aug. 7, 2018

(54) HYDROGEN AND NITROGEN RECOVERY FROM AMMONIA PURGE GAS

(71) Applicant: Casale SA, Lugano (CH)

(72) Inventors: Raffaele Ostuni, Lugano (CH);
Ermanno Filippi, Castagnola (CH);
Geoffrey Frederick Skinner, Reading (GB)

(73) Assignee: Casale SA, Lugano (CH)

( * ) Notice: Subject to any disclaimer, the term of this patent is extended or adjusted under 35 U.S.C. 154(b) by 105 days.

(21) Appl. No.: 14/937,285

(22) Filed: Nov. 10, 2015

(65) Prior Publication Data

US 2016/0060130 A1   Mar. 3, 2016

Related U.S. Application Data

(63) Continuation of application No. 13/639,860, filed as application No. PCT/EP2010/056753 on May 17, 2010.

(30) Foreign Application Priority Data

Apr. 7, 2010   (EP) .................................... 10159190

(51) Int. Cl.
*C01C 1/04*   (2006.01)
*C01B 3/02*   (2006.01)
(Continued)

(52) U.S. Cl.
CPC ................ *C01C 1/04* (2013.01); *C01B 3/025* (2013.01); *C01B 3/506* (2013.01); *C01B 3/52* (2013.01);
(Continued)

(58) Field of Classification Search
CPC . C01C 1/04; C01C 1/0476; F25J 3/062; F25J 3/0219; F25J 3/0233; F25J 3/0276;
(Continued)

(56) References Cited

U.S. PATENT DOCUMENTS

| 3,666,415 A | 5/1972 | Harmens |
| 3,675,434 A | 7/1972 | Crawford et al. |

(Continued)

FOREIGN PATENT DOCUMENTS

| EP | 2 022 754 A1 | 2/2009 |
| FR | 2300045 A1 | 9/1976 |

OTHER PUBLICATIONS

International Search Report issued in connection with PCT/EP2010/056753.

(Continued)

*Primary Examiner* — Anthony J Zimmer
(74) *Attorney, Agent, or Firm* — Akerman LLP

(57) ABSTRACT

An ammonia plant is disclosed, where ammonia purge gas (20), is sent to a cryogenic recovery unit, said recovery unit comprising means of cooling (102, 202, 302, 402, 502) and a high-pressure phase separator (103, 203, 303, 403, 503) operating at loop pressure; inside said unit the purge gas (20) is cooled to a cryogenic temperature, and a partial liquefaction of methane and argon is achieved; the high-pressure phase separator separates the cooled stream into a gaseous stream and a bottom liquid; the gaseous stream is reheated in a passage of a heat exchanger; the unit is then capable to export a gaseous stream (123, 223, 323, 423, 523) containing nitrogen and hydrogen at loop pressure, that can be reintroduced at the suction side of the circulator (4) of the loop.

9 Claims, 7 Drawing Sheets

(51) Int. Cl.
*C01B 3/50* (2006.01)
*C01B 3/52* (2006.01)
*C01B 3/56* (2006.01)
*F25J 3/06* (2006.01)
*F25J 3/02* (2006.01)

(52) U.S. Cl.
CPC .............. *C01B 3/56* (2013.01); *C01C 1/0476* (2013.01); *F25J 3/0219* (2013.01); *F25J 3/0233* (2013.01); *F25J 3/0276* (2013.01); *F25J 3/0285* (2013.01); *F25J 3/062* (2013.01); *F25J 3/068* (2013.01); *C01B 2203/048* (2013.01); *C01B 2203/0415* (2013.01); *C01B 2203/0465* (2013.01); *C01B 2210/007* (2013.01); *C01B 2210/0082* (2013.01); *F25J 2200/74* (2013.01); *F25J 2200/80* (2013.01); *F25J 2205/04* (2013.01); *F25J 2210/20* (2013.01); *F25J 2240/30* (2013.01); *F25J 2245/02* (2013.01); *F25J 2270/02* (2013.01); *Y02P 20/52* (2015.11)

(58) Field of Classification Search
CPC ........ F25J 3/0285; F25J 3/068; F25J 2240/30; F25J 2200/74; F25J 2200/80; F25J 2205/04; F25J 2270/02; F25J 2245/02; F25J 2210/20; C01B 3/56; C01B 3/52; C01B 3/506; C01B 3/025; C01B 2203/0415; C01B 2203/048; C01B 2210/007; C01B 2210/0082; C01B 2203/0465; Y02P 20/52
See application file for complete search history.

(56) References Cited

U.S. PATENT DOCUMENTS 4,058,589 A   11/1977   Haslam
4,524,056 A    6/1985   Banquy

OTHER PUBLICATIONS

International Preliminary Report on Patentability issued in connection with PCT/EP2010/056753.

HYDROGEN AND NITROGEN RECOVERY FROM AMMONIA PURGE GAS

CROSS-REFERENCE TO RELATED APPLICATIONS

This application is a continuation of U.S. patent application Ser. No. 13/639,860, filed Oct. 6, 2012, which is a national phase of PCT/EP2010/056753, filed May 17, 2010, and claims priority to European Patent Application No. 10159190.7, filed Apr. 7, 2010, the entire contents of which are incorporated herein by reference.

FIELD OF THE INVENTION

The invention relates to the field of synthesis of ammonia from a make-up gas containing hydrogen and nitrogen. More in detail, the invention discloses a novel process and unit for recovery of hydrogen and nitrogen, and optionally of argon, from the purge gas which is taken from the high-pressure synthesis loop of an ammonia plant.

PRIOR ART

A known process to produce ammonia involves the catalytic reaction of a make-up synthesis gas comprising hydrogen ($H_2$) and nitrogen ($N_2$), in a high-pressure (HP) synthesis loop usually operating at around 80-300 bar pressure. The make-up syngas is produced in a front-end section, upstream the synthesis loop, by reforming a suitable hydrocarbon feed such as natural gas. For example, the hydrocarbon feed is desulphurized, then steam-reformed in a primary reformer, obtaining a first gas product containing CO, $CO_2$ and $H_2$ at a temperature around 800° C.; the first gas product is further reacted with air, enriched air or oxygen in a secondary reformer or auto-thermal reformer (ATR), obtaining a second gas product at around 1000° C.; said second gas product is then treated in a series of pieces of equipment including shift converters where CO is converted to carbon dioxide and hydrogen; a $CO_2$-removal unit and a methanator. A main compression section, usually with a multi-stage compressor, feeds the make-up syngas to the HP synthesis loop.

A process for the production of ammonia and a process for the production of ammonia make-up syngas are disclosed for example in EP-A-2 022 754.

The synthesis gas supplied from the front-end to the synthesis loop is termed Make-Up Gas or MUG. Said gas comprises $H_2$ and $N_2$ in molar ratio around 3:1 and a small content, usually around 1% molar (mol %), of non-reacting components usually termed "inerts". The inerts are mainly methane ($CH_4$) and argon (Ar).

The inert gases accumulate in the synthesis loop circulating gas and their concentration is controlled by withdrawal of a purge gas stream from the loop. The purge gas extraction point is usually located upstream of the admission of the make-up gas; preferably where concentration of said inert gases is higher. By said purge gas extraction, the concentration of inert gases is controlled typically to 5 to 20 mol %.

The purge gas is generally recycled as a fuel, due to relevant content of methane. The purge gas, however, contains a substantial quantity of hydrogen and nitrogen, typically 5 to 10% of the total $H_2$ and $N_2$ content of the MUG. There is an incentive to recover the hydrogen and nitrogen content of the purge gas: unless recovered, it must be compensated by supply of additional relatively expensive MUG, as feed natural gas and process air.

A known process to recover hydrogen is membrane-based selective permeation. A hydrogen recovery unit (HRU) comprising one or more membrane stages allow to obtain a hydrogen-rich permeating gas and a hydrogen-depleted gas. A drawback of membrane-based systems however is that the hydrogen-rich gas is made available at a pressure much lower than that of the synthesis loop. For this reason, the recovered hydrogen-rich gas is typically re-introduced into the process at the suction of the first stage and/or subsequent stages of the synthesis gas compressor, where it is recompressed, along with the fresh make-up gas, up to the loop pressure. This means that the load and energy consumption of the compressor are increased or, in other words, the high pressure of the purge gas is lost in the HRU. Another drawback is that membrane permeation is selective to $H_2$, meaning that the $N_2$ content of the purge is lost from the process and is discharged into the plant fuel system.

SUMMARY OF THE INVENTION

The aim of the invention is to recover in a more efficient way the useful gaseous components of the purge gas stream taken from the synthesis loop of an ammonia plant. Hence, a first aim of the invention is to recover hydrogen ($H_2$) with no or less load increase of the make-up syngas compressor, compared to the known art; further aims of the invention are to effectively recover also nitrogen ($N_2$) and optionally also argon (Ar) as a separate stream; further aims of the invention are: to reject inerts (especially methane) from the loop circulating gas without loss of reactants $H_2$ and $N_2$; to increase the reactivity of the circulating gas, thus reducing the size of the ammonia synthesis equipment, and the energy consumption of the synthesis gas compressor.

The above purposes are achieved with an ammonia plant for synthesis of ammonia from a make-up gas containing hydrogen and nitrogen, the plant comprising: a synthesis loop operating at a loop pressure, said loop comprising at least a circulator and a synthesis converter; a purge line, extracting a purge gas stream at loop pressure from said synthesis loop; said purge gas stream containing hydrogen and nitrogen, plus methane and/or argon; a recovery unit disposed to recover a part of hydrogen and nitrogen content of a purge gas feed directed to said recovery unit; characterized in that said recovery unit comprises at least one heat exchanger to cool down said purge gas feed, and a high-pressure separation section comprising at least one high-pressure phase separator operating at said loop pressure, said heat exchanger(s) and separation section being arranged in such a way that: a) a purge gas feed entering said recovery unit is cooled in at least a passage of a heat exchanger of the recovery unit, down to a cryogenic temperature suitable to obtain at least a partial liquefaction of methane and argon in the one or more downstream phase separator(s); b) a liquefied part of the purge gas and a recovery gaseous stream containing hydrogen and nitrogen at loop pressure are separated in said high-pressure separation section, and c) said recovery gaseous stream at loop pressure is reheated in at least a passage of a heat exchanger of the recovery unit, the so obtained reheated gaseous stream being exported from said recovery unit at said loop pressure, and returned to the synthesis loop at said loop pressure.

The term loop pressure indicates the pressure of the loop, which may vary according to the synthesis process. The loop pressure is generally greater than 50 bar; in most cases in the range 50 to 500 bar and usually in the range 80 to 300 bar.

Typically the pressure is around 150 bar. The purge gas is at said loop pressure, due to its extraction directly from the ammonia synthesis loop.

The purge gas feed directed to the recovery unit can be the purge gas as taken from the synthesis loop, or previously treated e.g. to remove ammonia. In some embodiments of the invention, the purge gas taken from the loop is washed to remove an ammonia solution, and ammonia-free gas is then passed through a device suitable to remove water, such as a molecular sieve, so that a dry and ammonia-free purge gas feed is directed to the recovery unit.

The recovery unit may comprise one or more phase separators. The phase separators may be arranged to operate at multiple pressure and/or temperature levels. In some embodiments, the recovery unit comprises a plurality of phase separators at different pressures and arranged in a cascade. The cascade comprises at least a first high pressure separator operating at loop pressure, and at least a second separator operating at a pressure substantially lower than said loop pressure. The second and any subsequent separator of the cascade receives a liquid outlet from the previous separator; the recovery unit is then able to export said recovery stream substantially at loop pressure, and one or more further gaseous streams at lower pressure levels. The hydrogen and nitrogen recovered at lower pressure may be directed to the suction stage of the make-up syngas compressor, or to an intermediate stage thereof.

Said high-pressure (HP) separation section may comprise one or more phase separators, all operating at the loop pressure. In some embodiments, the high-pressure separation section comprises a plurality of phase separators operating at different temperatures, namely a first phase separator, at least a second separator at a lower temperature than the first separator, and eventually further separators operating at even lower temperatures. In such embodiments, the second and any subsequent separator of said high-pressure separation section receives a gaseous phase separated in the previous separator of the section, and cooled in an intermediate heat exchanger.

A multi-temperature arrangement of the high-pressure separation section can be combined with multi-pressure separation. In one embodiment, for example, the recovery unit comprises: a first high pressure separator; a second high pressure separator operating at a lower temperature; a heat exchanger to cool a gaseous stream separated in said first high pressure separator and directed to said second high pressure separator; a further separator operating at a lower pressure, which is substantially lower than said loop pressure. The recovery unit is then able to export a gaseous stream containing hydrogen and nitrogen substantially at loop pressure, and at least another gaseous stream containing hydrogen and nitrogen at a lower pressure.

Preferably, the recovery unit comprises at least one expansion device, arranged to expand a liquid stream obtained in said phase separator or phase separators, to provide at least part of net refrigeration of said recovery unit. Said expansion device is for example a let-down turbine or an expander or a common valve.

All heat exchangers, phase separators and expansion devices of the recovery unit can be arranged in a cold box.

A preferred embodiment for the one or more heat exchangers of the recovery unit is a multi-passage heat exchanger. Possible embodiments, which are cited as non limiting examples, include a plate-fin heat exchanger, or a coil-wound exchanger, or a printed-circuit heat exchanger, or a shell-and-tube unit. Any known type of heat exchanger, however, is applicable, the type of the heat exchanger is not an essential feature of the invention. The high-pressure separator can be followed by further separators operating at a lower pressure, all included in the cold box, as will be discussed below. The high-pressure separation section may comprise one or more separator vessels, refluxed mass transfer devices or runback condensers. The one or more expansion devices may comprise a let-down turbine, a liquid expander adapted to recover some mechanical work from the expansion, or a common valve.

The high-pressure separation section operates at loop pressure, which shall be intended as the nominal pressure of the purge gas extracted from the loop, minus the pressure losses. In substance, the working pressure of the phase separator or separators of said section is the pressure of the loop, minus the pressure loss due to ammonia and water removal, if any, and through any upstream device such as one or more heat exchangers. In particular, there is no device specifically provided to reduce the pressure of the purge gas fed to the recovery unit. In preferred embodiments of the invention, the high-pressure separation section works at a pressure which is at least 90% of the loop pressure.

The recovery gaseous stream containing hydrogen and nitrogen, which is exported from the recovery unit at loop pressure, can be returned to the suction of the circulator preferably by means of a dedicated line.

The cryogenic temperature referred above is preferably selected such that less than 50% of nitrogen content in the purge gas feed directed to the recovery unit is condensed, and more than 50% of methane and argon are condensed. For example said cryogenic temperature can be between 200° C. below zero, and 150° C. below zero, i.e. around 70 to 120 K.

Another aspect of the invention is recovery of argon as a separate stream. Accordingly, the recovery unit may comprise a distillation column arranged to receive expanded bottom stream from the high pressure separation section, for example from a high-pressure separator or from the lowest pressure separator when the recovery unit comprises a plurality of separators in cascade at different pressure levels. Said distillation column provides an argon-rich overhead vapour which is preferably reheated in a passage of a heat exchanger of the recovery unit, before being exported from said recovery unit.

The notable advantage of the invention is that a recovered hydrogen and nitrogen are made available at a pressure substantially equal to the pressure of the feed stream of the recovery unit, which means at a pressure close to the loop pressure. For example, preferred embodiments of the invention provide that hydrogen and nitrogen are recovered at a pressure which is 90% or more of loop pressure.

Hydrogen and nitrogen recovered at such high pressure can be reintroduced directly into the loop. Preferably the recovery unit according to the invention can be connected on the suction of the circulator, more precisely the purge stream can be taken at a point downstream the synthesis converter section and the recovery unit placed in parallel with the cold exchangers in the synthesis loop, with the recovered stream returned to the suction of the circulator, so that the power requirement of the syngas compressor is not impacted in any way. As an alternative, it can be connected across the circulator of the loop: the purge gas is taken at the delivery side of the circulator, upstream the synthesis converter section, and the gaseous stream containing recovered hydrogen and nitrogen is re-introduced into the synthesis loop at the suction side of said circulator, meaning that the pressure lost in the recovery unit substantially equals the pressure difference across the circulator. This pressure difference is typically around 3 to 10 bar, depending on the selected extraction point.

If appropriate, a small compressor can be arranged to re-compress the recovered stream for introduction in the loop; the power demand of said compressor is however small.

Due to the recovery of $H_2$ and $N_2$ at loop pressure, the power and flow capacity requirements of the synthesis gas compressor is reduced, relative to a conventional plant, with or without a membrane-type HRU. The only significant energy consumption of a recovery unit according to the invention is the power needed to compress the recycle stream in the loop circulator, if any.

A further advantage of the invention is that recovery of $H_2$ and $N_2$ is higher than conventional membrane-based systems. Recovery of $H_2$ at loop pressure allowed by the invention is greater than 90% and typically 97-98%, compared to around 85-90% of a membrane-type HRU. Recovery of $N_2$ at loop pressure is typically greater than 50%. This is a distinct improvement over a membrane HRU, from which more than 80% of the $N_2$ in the purge is lost from the process, being discharged into the fuel system. Consequently the supply of process air to the secondary reformer can be reduced, approaching the stoichiometric value.

It should be noted that all gaseous $H_2$ and $N_2$ separated in the high-pressure separator can be directed to the suction of the circulator of the loop. As stated above, some of the embodiments may provide additional recovery at lower pressure levels. It is a notable feature of the invention, however, that all the overhead vapour of the higher pressure separator is suitable to feed to the suction of the circulator of the loop.

Another advantage is in the following. Due to the low power increment (if any) of the loop circulation compressor, it can be convenient to enlarge significantly the fraction of the loop purge gas sent to the recovery unit, relative to conventional designs of synthesis loop typically using a membrane type HRU. This facility for enlarging the purge flow with low power penalty has the following advantages: the recovery of $N_2$ at high pressure is increased; because methane is more easily condensed than $N_2$ or argon, an increase of purge gas extraction rate particularly reduces the methane concentration in the loop circulating gas; in turn this feature improves the performance of the ammonia synthesis converter and synthesis loop, because of the improved reactivity of the circulating gas; moreover, higher concentration of methane in the make-up gas can be tolerated; the power of the synthesis gas compressor is lower than in a conventional plant, and its size is smaller, because the recovered stream is returned at the suction of the circulator, and the syngas net consumption is minimum; the energy consumption of the plant is lower; pure argon can be separated from methane in an additional column, and supplied as an alternate product.

An aspect of the invention is also a process for recovering hydrogen and nitrogen from ammonia purge gas, and rejecting methane to achieve a more reactive circulating gas without loss of the reactants hydrogen and nitrogen, according to claims 1 to 9.

The invention is applicable to both new plants, for design with smaller synthesis gas generating equipment, synthesis gas and air compressor, and ammonia synthesis loop equipment; and to revamps, to debottleneck the synthesis section and compressor.

Another aspect of the invention is that the flow of purge and operating conditions of the recovery unit can be adjusted to control the ratio of circulating $H_2$ and $N_2$ in the loop, providing also a means to stabilize the composition and operation of the synthesis loop, compensating possible changes in the plant front-end, e.g. a change in process air flow. Preferably, the flow rate of the purge is such that the loop circulating gas has a substantially low concentration of inerts such as $CH_4$ and Ar, with substantially no loss of reactants $H_2$ and $N_2$.

The invention will now be elucidated with the help of the following description of preferred and non-limiting embodiments.

DETAILED DESCRIPTION OF PREFERRED EMBODIMENTS

Figure 1:
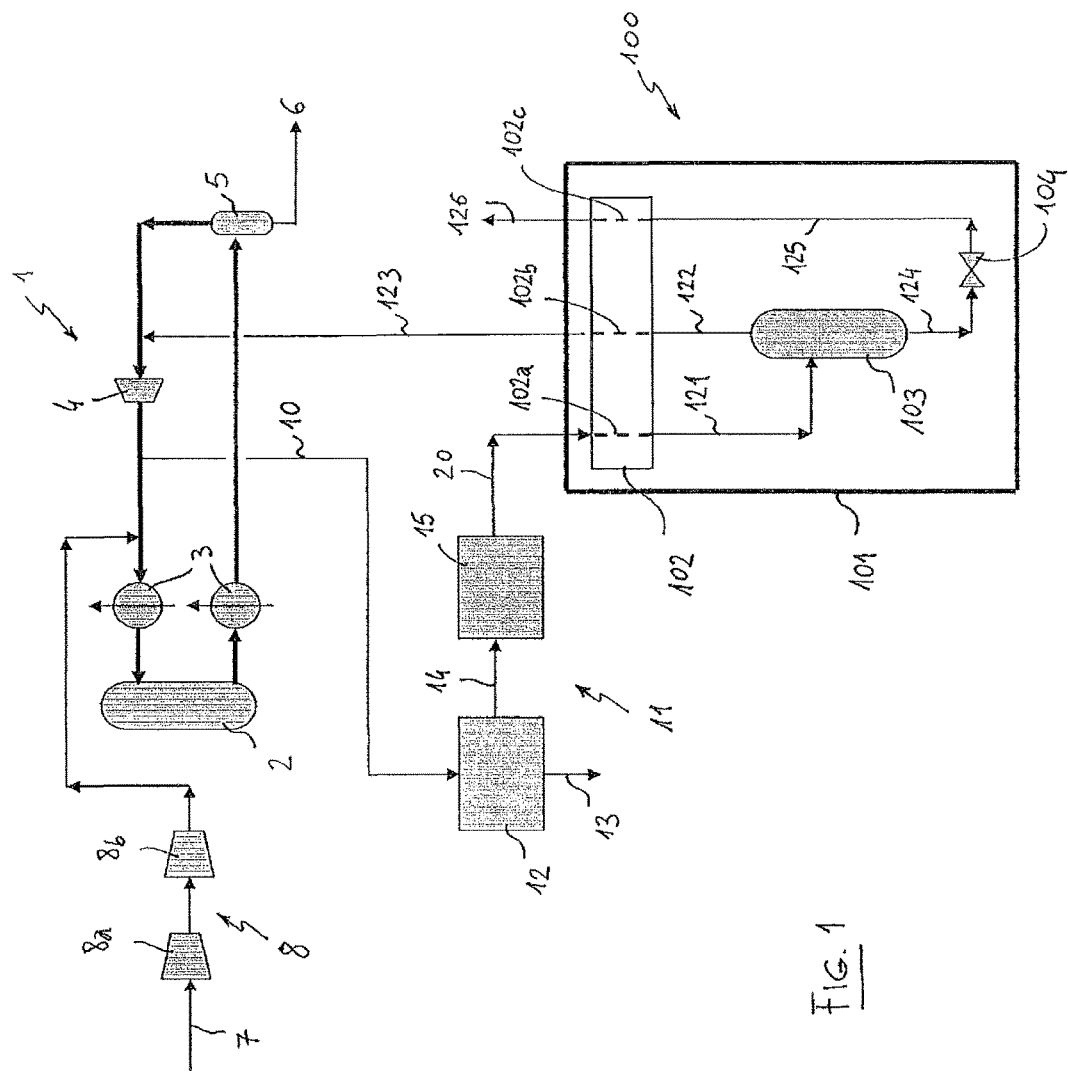
FIG. 1 is a scheme of a plant for the synthesis of ammonia featuring the recovery of hydrogen and nitrogen from the purge gas, in a single-pressure recovery unit according to a first embodiment of the invention.

Referring to the first embodiment of FIG. 1, a plant for synthesis of ammonia from a make up gas containing hydrogen and nitrogen comprises a synthesis loop 1 operating at a loop pressure, which is usually a high pressure such as 150 bar or more. The loop 1 comprises basically a converter 2, heat exchangers 3, a circulator 4 and a separator 5, delivering the ammonia product 6. The loop is fed with make-up gas 7 by means of a main compression unit 8.

The make-up gas 7 is produced in a front-end section of the plant, for example by reforming a suitable hydrocarbon source, at a pressure significantly lower than the loop pressure of loop 1. The main compression unit 8 raises the pressure of the make up gas delivered by said front-end section to the pressure level of the loop. The compression unit 8 is normally a multi-stage unit, in the figure two stages 8a and 8b are shown. The circulator 4 overcomes the pressure losses along the loop 1 itself, including the pressure losses of converter 2, exchangers 3, etc. . . . which are usually a few bars.

The make up gas 7 contains some components which are inert to the ammonia synthesis reaction, and so termed "inert gases". The inert gases are mainly composed of methane and/or argon. Accumulation of inert gases in the loop 1 has a negative influence on the efficiency. To avoid such accumulation, a suitable quantity of a purge gas is extracted from the loop 1. In the example of FIG. 1, ammonia purge gas 10 is extracted from the synthesis loop 1 at a point downstream of the loop gas circulator 4. The pressure of the purge gas 10 is substantially the loop pressure.

The purge gas 10 contains some ammonia, which is preferably recovered. Hence, the gas 10 is first treated in a section 11, comprising a washing device 12 where the gas is washed with water, to remove ammonia which is recovered as solution 13. Ammonia-free gas 14 is then dried using a suitable device such as a molecular sieve adsorbent 15. The dry, ammonia-free purge gas 20 then flows to a cryogenic recovery unit 100.

The pressure of the ammonia-free dry gas 20 is still substantially equal to the loop pressure. The pressure of stream 20 is of course slightly lower than the loop pressure due to loss of devices 12 and 15; typically the pressure of stream 20 will be 0.3 to 3 bar below the loop pressure at the point wherefrom the purge 10 is taken. The temperature of the stream 20 is typically between −30° C. and +40° C. (243 to 313 K).

The cryogenic recovery unit 100 comprises an insulated cold box 101, a multi-passage heat exchanger 102, a high-pressure gas-liquid separator 103 and an expansion device 104. The expansion device 104 can be an expander or pressure reduction valve.

The purge gas 20 entering the unit 100 is cooled in a passage 102a of the above-mentioned heat exchanger 102 to a temperature suitable to condense at least 50% of argon and methane. Preferably said temperature is chosen such that less than 50% of its nitrogen content is condensed and more than 50% of argon and methane content of said stream 20 are condensed. In a common case, a suitable temperature may be found in the range −150° C. to −200° C.

After passage in the heat exchanger 102, a cryogenically cooled stream 121 is obtained. Said cooled stream 121 is then directed to the separator 103 where a vapor phase 122 and a liquid phase 124 are obtained. In the example, the overhead vapor 122 leaving the separator 103 is reheated to near-ambient temperature in a second passage 102b of the heat exchanger 102, thus obtaining a recovery stream 123 containing hydrogen and nitrogen at a loop pressure, and having reduced concentration of inert gases such as methane and argon. The pressure of said recovery stream 123 allows a direct re-introduction into the loop 1, preferably at a point upstream the loop gas circulator 4.

The bottom liquid 124 from the separator, having a higher concentration of methane and argon, is depressurized in the expansion device 104 in which it vaporizes partially, generating thereby a drop in temperature. Depressurization through said device is substantial, typically to a pressure under 10 bar. The so obtained partially vaporized stream 125 then enters a third passage 102c in the heat exchanger 102, wherein it is fully vaporized and reheated to near-ambient temperature.

The output stream 126 of said third passage 102c, which contains most of the methane and argon content of the purge gas, is typically used as fuel gas.

It can be noted that the purge gas 20 is cooled by heat exchange with the vapor 122 and expanded stream 125. At least a part of the net refrigeration, which is necessary to overall balance the heat exchanger 102, to maintain the temperature of the gas-liquid separator 103, is provided by expansion of the liquid stream 124. If refrigeration given by the expander 104 is sufficient, external refrigeration is not required, although such refrigeration may be supplied wherever appropriate, for example by a nitrogen refrigeration circuit.

The expansion device 104 may be a let-down valve or turbine. Use of a turbine allows recovering also some work from the expansion of liquid 124, but most importantly, by work extraction, it decreases the stream temperature more than lamination through a valve: the temperature driving force on the heat exchanger is therefore improved, reducing the required exchange area and reducing the need for further external refrigeration.

The assembly comprising the multi-passage heat exchanger 102, the gas-liquid separator 103 and the pressure reduction device 104 is enclosed in the insulated cold box 101. The multi-passage heat exchanger 102 can be of any convenient construction, typically a plate-fin heat exchanger, although spiral-wound or printed-circuit heat exchanger types may be substituted, particularly for very high pressure applications, e.g. over 150 bar in the gas-liquid separator.

Further embodiments of the invention provide multi-pressure separation of hydrogen and nitrogen for higher recovery of hydrogen from the purge gas, and a resulting reduction of loss of hydrogen into the fuel gas stream.

Figure 2:
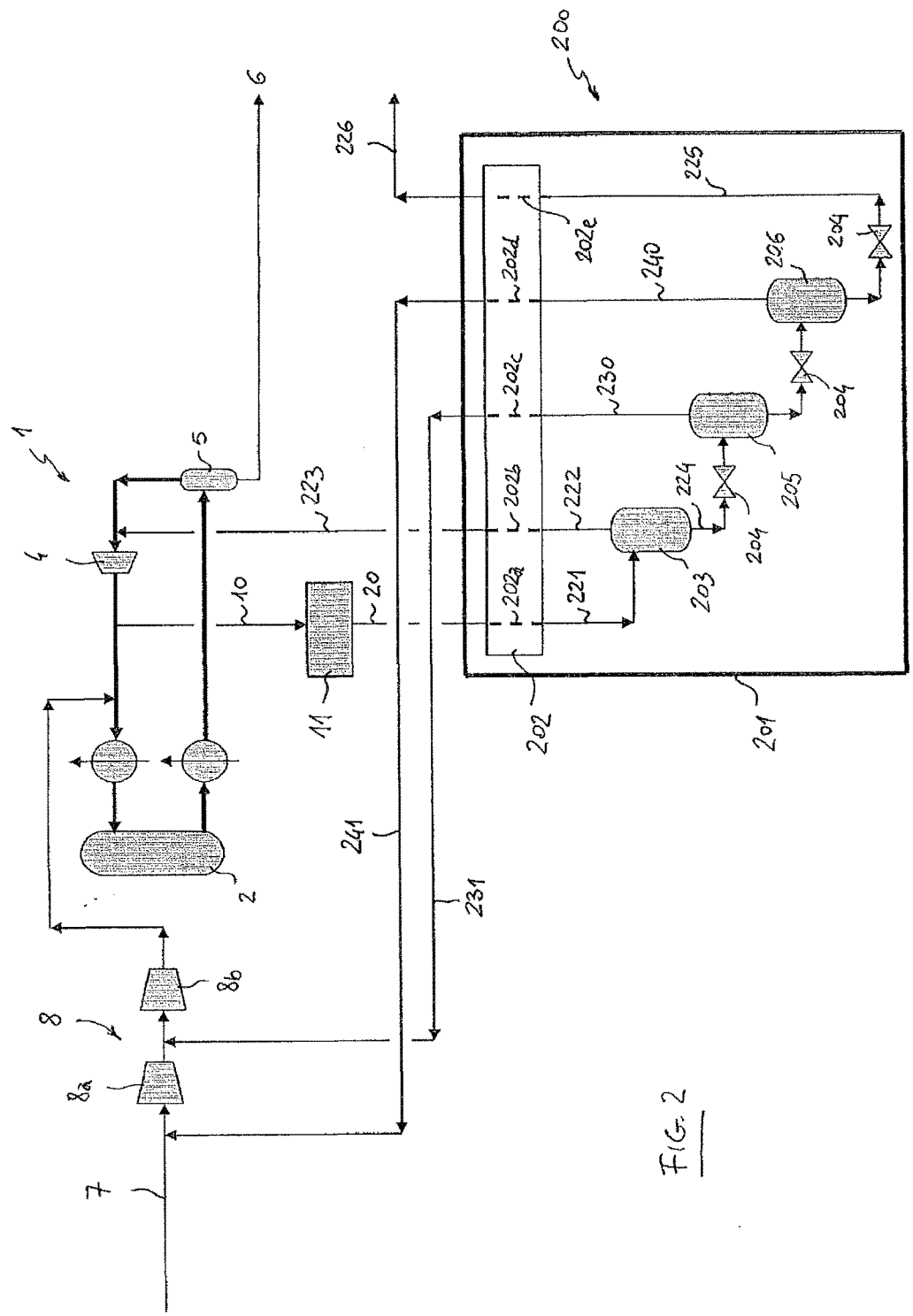
FIG. 2 is a scheme of a plant with multi-pressure recovery, according to another embodiment.

Referring to the exemplificative embodiment of FIG. 2, a recovery unit 200 comprises an insulated cold box 201, a multi-passage heat exchanger 202 with passages 202a to 202e, a high-pressure (HP) gas-liquid separator 203 followed by a medium-pressure (MP) gas-liquid separator 205 and a low-pressure (LP) gas-liquid separator 206. Said separators are connected in cascade with expansion devices 204 in between, i.e. the bottom liquid from a separator passes in the following separator, via a respective expansion device 204.

The purge gas 10 removed from the synthesis loop 1, at the delivery side of the circulator 4, is washed to remove ammonia vapor and dried in the block 11, obtaining ammonia-free dry gas 20, as in the previous example. Said gas 20 is then cooled in the first passage 202a of the multi-passage heat exchanger 202 preferably to a temperature, as stated above, so that less than 50% of its nitrogen content is condensed and more than 50% of its argon and particularly methane are condensed.

The cooled stream 221 is directed to the HP separator 203 and the overhead vapor 222 leaving the HP separator is reheated to near-ambient temperature in the second passage 202b of the heat exchanger, forming a recovery stream 223 at loop pressure, that can be reintroduced into the loop 1 at the suction side of the circulator 4.

The bottom liquid 224 from the HP separator 203 is first depressurized in a pressure reduction device 204, and then enters the MP separator 205 in a partially vaporized state. The vapor 230 from the MP separator 205, containing a part of the hydrogen dissolved in its liquid feed, is reheated to near-ambient temperature in a third passage 202c of the heat exchanger. The so obtained MP hydrogen-rich stream 231 is then recycled to the loop 1. However, as the pressure is significantly lower than that of HP stream 223, said MP stream 231 is sent back to the compression stage 8, for example to the suction of the second stage 8b. It is clear from this arrangement that the pressure in the MP separator 205 should be slightly higher than the suction pressure of said second stage 8b.

The bottom liquid from the MP separator 205 is next depressurized in a further pressure reduction device 204, and then enters the LP separator 206 in a partially vaporized state. The vapor 240 from the LP separator, also containing a part of the hydrogen dissolved in its liquid feed, is reheated to near-ambient temperature in the passage 202d of the heat exchanger; the so obtained LP hydrogen-rich stream 241 is then recycled to the compression stage 8, conveniently to the suction of the first stage 8a.

Preferably, the pressure of the MP separator 205 is about 50% of the pressure of HP separator 203, and pressure of the LP separator 206 is about 25% of the pressure of said HP separator 203.

The bottom liquid from LP separator 206 is depressurized to a pressure typically under 10 bar in another expansion device 204, in which it vaporizes partially to stream 225. This stream 225 then enters a passage 202e of the heat exchanger, wherein it is fully vaporized and reheated to near-ambient temperature, forming the stream 226 which is typically used as fuel gas.

Any of the expansion devices 204 can be a valve or expanders such as a liquid expanding turbine. As with the single-pressure arrangement of FIG. 1, the partial vaporization which takes place in the pressure reduction of the liquid from the bottom of the separators typically provides sufficient cooling to refrigerate the unit 200 and to maintain the temperature of the gas-liquid separators without application of external refrigeration, although such refrigeration may be supplied, for example, by a nitrogen refrigeration circuit.

The advantage of a multi-pressure hydrogen recovery, as in FIG. 2, is a higher hydrogen recovery. For example an embodiment with three separators 203, 205 and 206 can achieve a $H_2$ recovery rate higher than 98%, compared to around 95% of a single-pressure embodiment. It is possible to provide further stages of intermediate hydrogen recovery, especially if the main compressor 8 comprises more than two stages of synthesis gas compression, and then re-introduction at various pressures is facilitated. Embodiments with two pressure levels are also possible, typically only providing an HP separator and an LP separator and recycling the vapor from the LP separator to the suction of the first stage 8a of the synthesis gas compressor.

Figure 3:
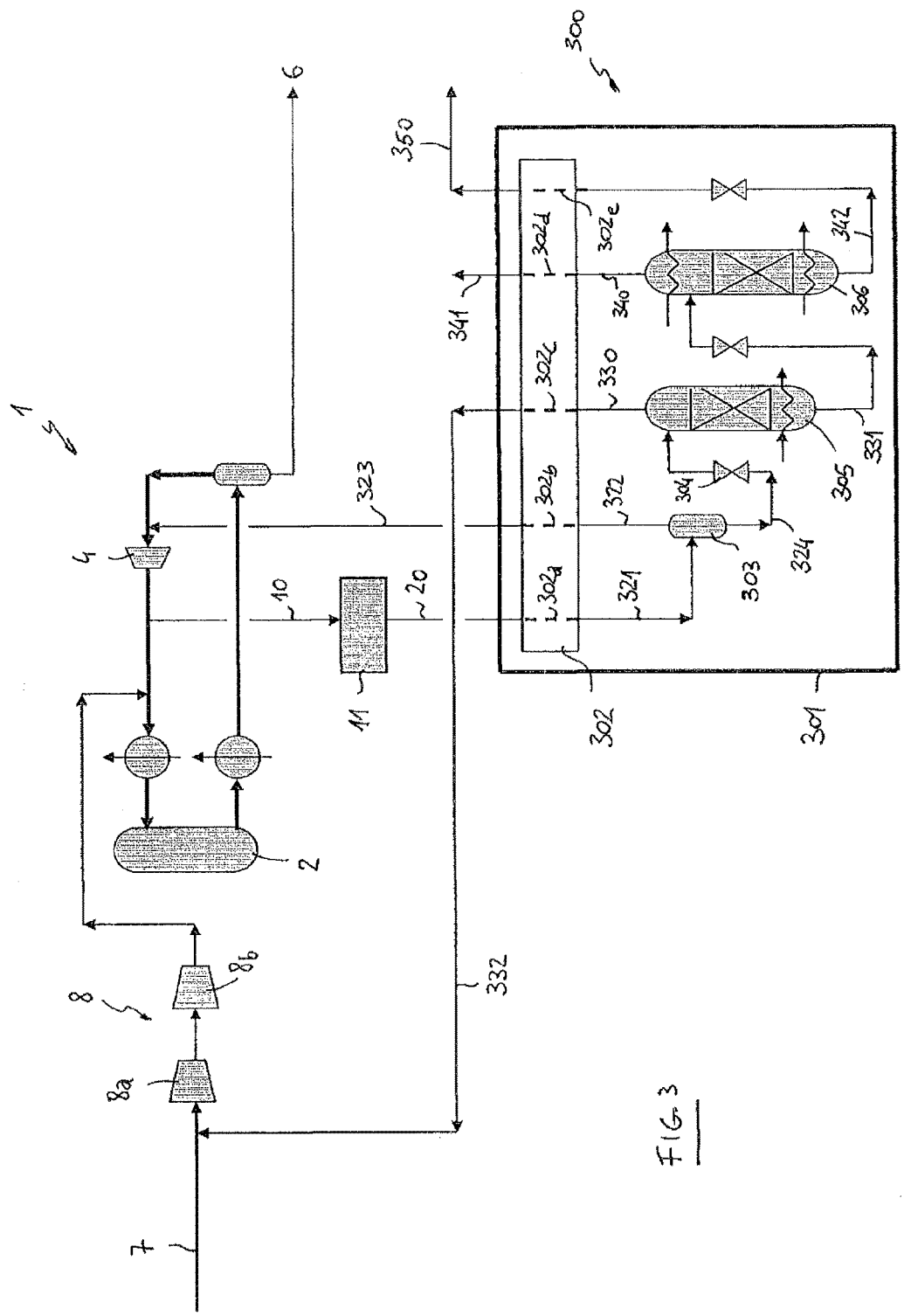
FIG. 3 relates to an embodiment of the invention providing recovery of argon as a separate stream.

Another embodiment is shown in FIG. 3, featuring recovery of argon as a separate export stream.

A recovery unit 300 comprises an insulated cold box 301, a multi-passage heat exchanger 302 with passages 302a to 302e, a high-pressure (HP) gas-liquid separator 303. The gas-liquid separator 303 is followed by a reboiled stripper 305 and a distillation column 306. Said stripper 305 and column 306 operate at a lower pressure than the separator 303, and expansion devices 304 are arranged between said items and downstream the column 306.

The purge gas 20, after ammonia removal and drying in block 11 as above, is cooled in the first passage 302a and resulting stream 321 is directed to the HP separator 303. The gaseous phase 322, reheated through passage 302b, forms the high-pressure recovery stream 323 containing hydrogen and nitrogen, that can be reintroduced in the loop 1 for example, as in the previous embodiments, at suction of the circulator 4.

The bottom liquid 324 leaving the HP separator 303, in this embodiment, is depressurized through a valve 304 into the top of the reboiled stripper 305, which separates the hydrogen and nitrogen content as overhead vapor 330 and the argon and methane content as bottom liquid 331. The vapour 330 after reheating near-ambient temperature in a third passage 302c through the heat exchanger, is recycled to the suction of the synthesis gas compressor 8a as stream 332.

The bottom liquid 331 from the stripper 305 is further depressurized in a device 304 and introduced into the distillation column 306. The overhead vapor 340 from said distillation column 306 comprises a significant amount of argon. Said vapour 340 is reheated to near ambient temperature in a fourth passage 302d through the heat exchanger, forming a reheated stream 341 containing argon which is available as a separate export stream from the unit 300.

The bottom liquid 342 from the column 306 has a relevant content of methane, is evaporated and reheated to near ambient temperature in a fifth passage 302e through the heat exchanger obtaining fuel stream 350.

The advantage of this embodiment is the separate recovery of argon. The only loss of argon from the process will take place as an impurity in the methane by-product 350, and small argon content in the low-pressure recycle stream 332.

More generally, a column 306 can be arranged to receive the bottom liquid from the lowest-pressure separator, in a multi-pressure embodiment like the one disclosed in FIG. 2. In this way, a multi-pressure unit is able to export a separate argon-rich stream.

Due to the requirements of reboiling the stripper 305 and the distillation column 306, a supplementary refrigeration system (not shown) is required. Said supplementary refrigeration system is typically a nitrogen cycle.

Figure 4:
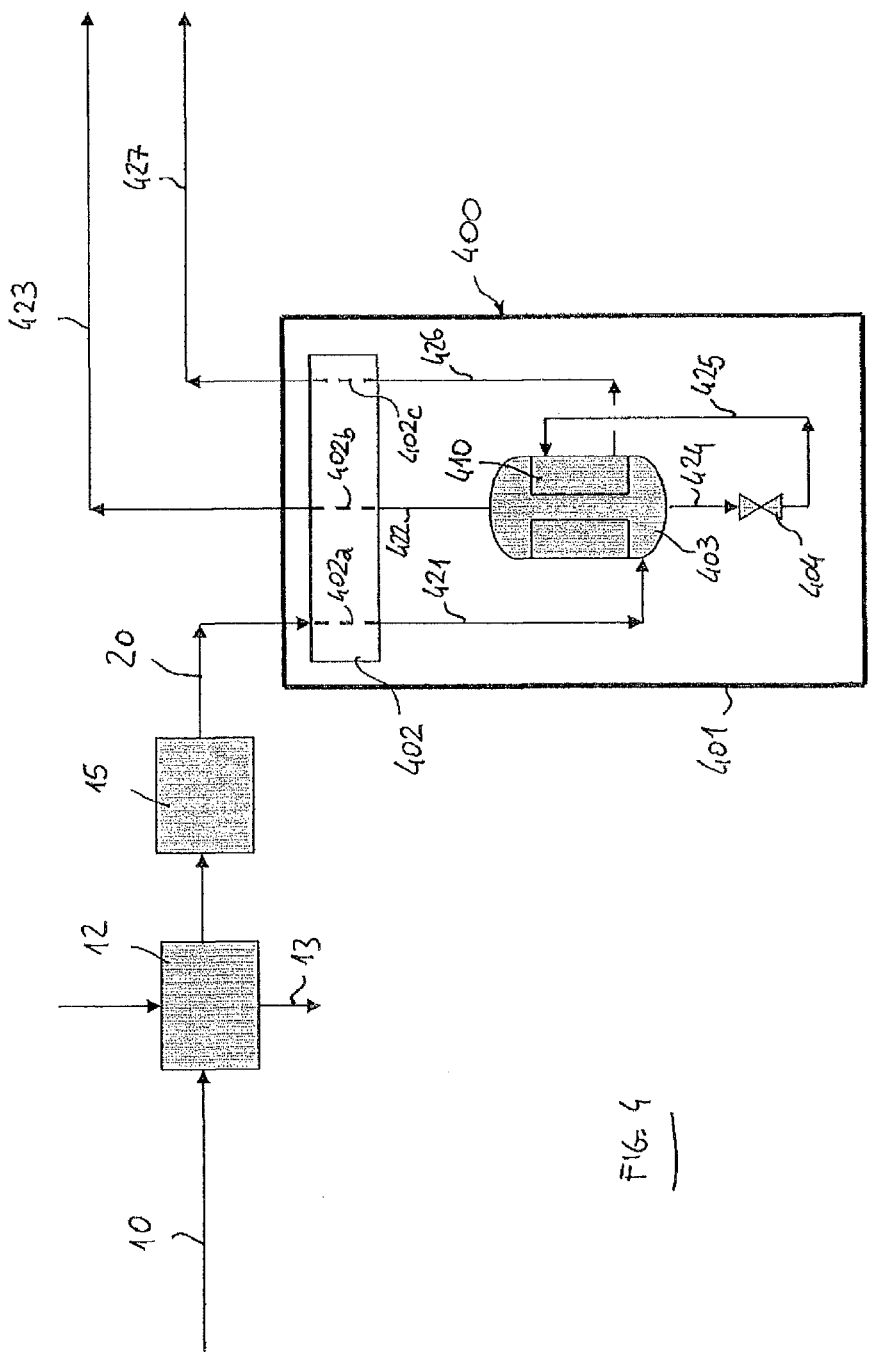
FIG. 4 discloses a variant of FIG. 1 where the recovery unit comprises a refluxed mass transfer device.

FIG. 4 illustrates a further embodiment, which is substantially a modified version of the embodiment of FIG. 1, giving improved removal of argon and methane from the high pressure purge gas. This embodiment comprises replacement of the HP separator vessel with a run-back condenser 403. Hence, a unit 400 comprises basically a cold box 401, a heat exchanger 402, the run-back condenser 403 and expansion device 404.

The feed 20, is cooled to, or near to, its dewpoint temperature in the first passage 402a of the heat exchanger 402. The cooled stream 421 then enters the base of the runback condenser 403. Said condenser comprises a heat exchanger 410, the hot side of said heat exchanger 410 having vertical passages with enlarged gas flow area, such that liquid condensed from the upward flowing can run downwards, counter-current to the feed 421, and exit the condenser at its base, as condensed stream 424. This arrangement provides numerous mass transfer stages, in place of only one stage in a simple separator. The vapor 422 leaving the top of the run-back condenser 403 is reheated to near-ambient temperature in a second passage 402b of the heat exchanger and forms a high-pressure recovery stream 423, which is able to rejoin the ammonia synthesis loop at the suction of the loop gas circulator.

The bottom liquid 424 from the runback condenser comprising argon, methane and nitrogen is first depressurized to a pressure typically under 10 bar in the expansion device 404, which as in the other embodiments, could be a valve or a liquid expander. Said liquid 424 vaporizes partially, generating thereby a drop in temperature. The partially vaporized stream 425 then enters the cold side of the runback condenser 403, namely the cold side of the heat exchanger 410. As said stream 425 is evaporated, it provides most or all of the cooling required by the hot side of the runback condenser.

The essentially vaporized stream 426 then enters the third passage 402c in the heat exchanger, wherein it is fully vaporized and reheated to near-ambient temperature, forming the export fuel stream 427. The partial vaporization which takes place in the let-down valve or turbine 404 typically provides sufficient cooling to maintain the temperature of the cold box runback condenser without application of external refrigeration, although such refrigeration may be supplied for example by a nitrogen refrigeration cycle.

Figure 5:
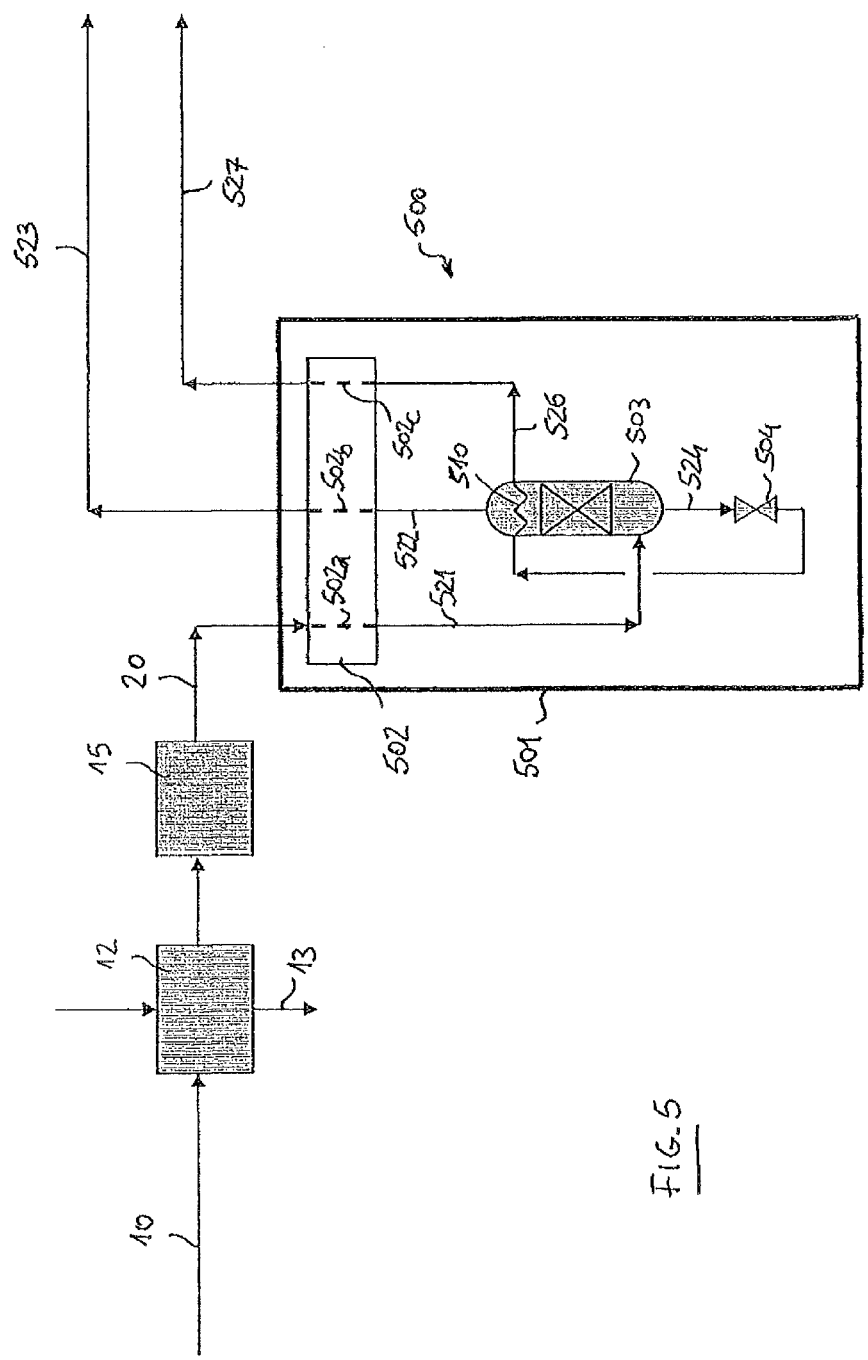
FIG. 5 discloses a variant of FIG. 1 where the recovery unit comprises a runback condenser.

As an alternative to a runback condenser, a conventional refluxed absorber may be substituted, as illustrated in FIG. 5.

More in detail, according to this further embodiment a unit 500 comprises basically a cold box 501, a heat exchanger 502, a refluxed absorber 503 and expansion device 504. The cooled stream 521 from first passage 502a enters the absorber 503; the overhead vapour 522, after reheating in passage 502b, forms a recovery stream 523 at loop pressure, containing hydrogen and nitrogen; the bottom liquid 524, after expansion, is heated and partly evaporated passing in a heat exchanger 510 inside the absorber 503, obtaining the stream 526 which is further heated in passage 502c and exported as fuel stream 527 containing methane, nitrogen and argon. Other details can be taken from embodiments of FIG. 4 or FIG. 1.

Figure 6:
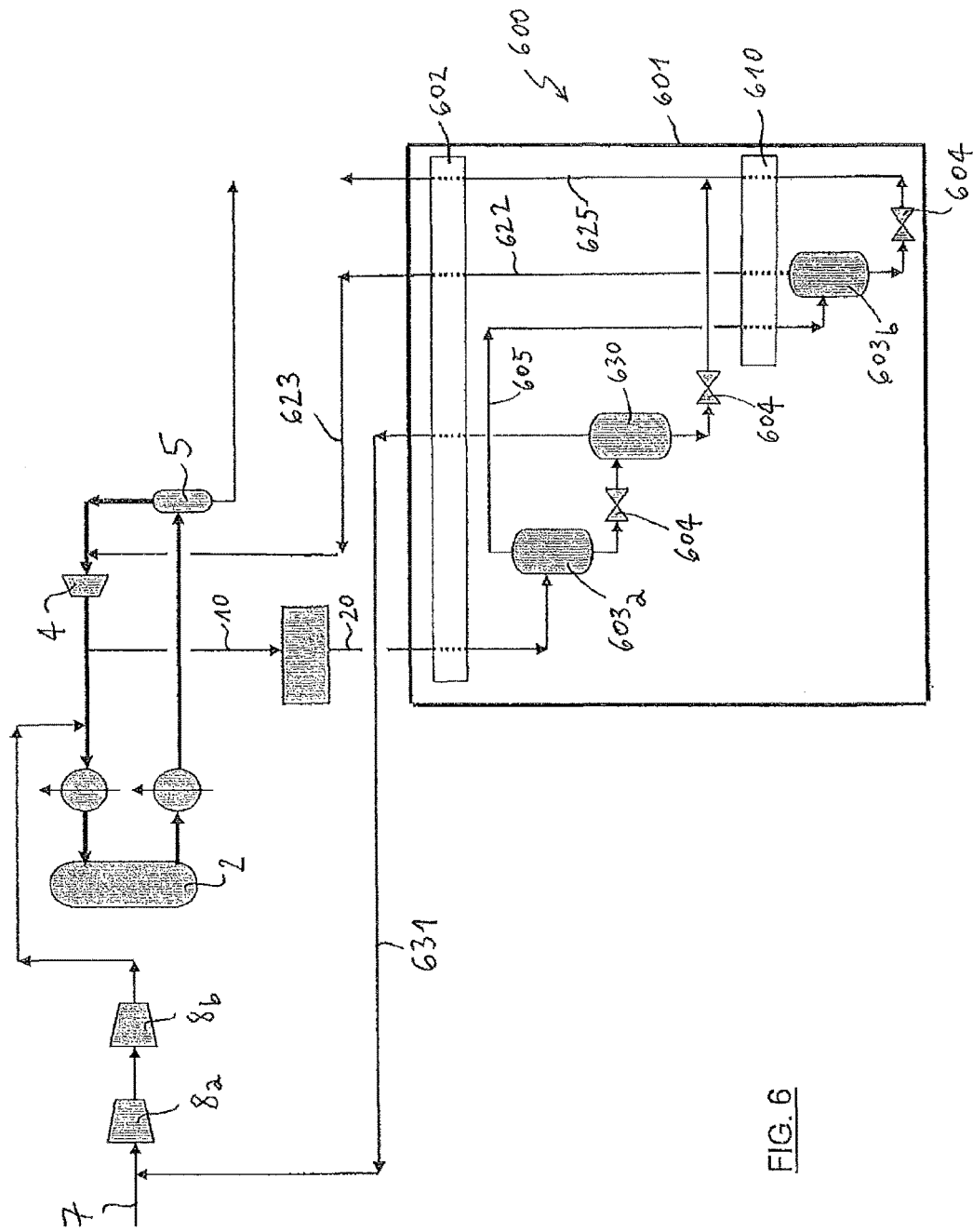
FIG. 6 is a scheme of a plant in which separation of the inerts occurs at different temperature levels, according to another embodiment.

In the above exemplificative embodiments, the recovery unit has an HP separation section with one phase separator. A further embodiment of the invention is shown in FIG. 6. This scheme incorporates recovery of hydrogen from the liquid exiting the high pressure separator as incorporated in FIG. 2, together with a second high pressure separator operating at lower temperature. Overall these features result in higher hydrogen recovery and higher rejection of inerts (particularly $CH_4$) relative to the first embodiment shown in FIG. 1.

The recovery unit 600 in the cold box 601 comprises a high-pressure separation section with two HP phase separators 603a and 603b operating substantially at the same pressure (i.e. loop pressure). The second separator 603b operates at a lower temperature than the first separator 603a, due to heat exchanger 610. Expansion devices are shown as 604.

As in the previous embodiments, the purge gas feed 20 is cooled in a passage of a main heat exchanger 602, and then is directed to the first high-pressure separator 603a.

The liquid leaving from the bottom of the first separator 603a at higher temperature is flashed into a low pressure separator 630, which is in communication with the suction of the first stage 8a of the synthesis gas compressor. Accordingly the flash gas evolved in the said low pressure separator (mainly hydrogen) is returned to the synthesis loop (stream 631) via the synthesis gas compressor.

The vapour 605 from the first separator 603a is then further cooled in a passage of the heat exchanger 610, resulting in additional condensation of inerts, particularly $CH_4$. The resulting condensate is separated in the second separator 603b. This condensate is combined with the liquid from the high temperature separator, and the combined stream 625 is evaporated and reheated to near-ambient temperature, passing through passages of the heat exchanger 610 and 602, for use as fuel. The vapour 622 leaving the low temperature separator is reheated to near-ambient temperature by said heat exchanger 610 and 602, and returned to the synthesis loop 1 at synthesis loop pressure, i.e. at the suction side of the circulator 4 as a recovery stream 623.

Other particulars of the embodiment of FIG. 6 are similar to those of the embodiments previously disclosed, and can be readily appreciated from the figure.

All the above exemplificative embodiments show the advantages of the invention, including: higher acceptable concentration of methane in the make-up gas; lowest process air demand of all process schemes, because nitrogen is recovered; lowest synthesis gas compressor capacity and power demand, because full utilization of hydrogen and nitrogen, recycle of recovered purge at the suction of the circulator; very high $H_2$ recovery from purge gas; high $N_2$ recovery from purge gas; synthesis loop inerts content lower than with equivalent conventional practice; reduced size of ammonia synthesis loop equipment.

A compression of the recycle stream 123, 223, 323, 423, 523 or 623 may be necessary, but would need a little power due to the fact that said streams are exported substantially at the pressure of the loop, minus the pressure drops in the recovery unit.

The invention is applicable to both revamps and new plants. An ammonia plant can be revamped for example by the provision of any of recovery units 100, 200, 300, 400, 500 and 600 as above disclosed.

Figure 7:
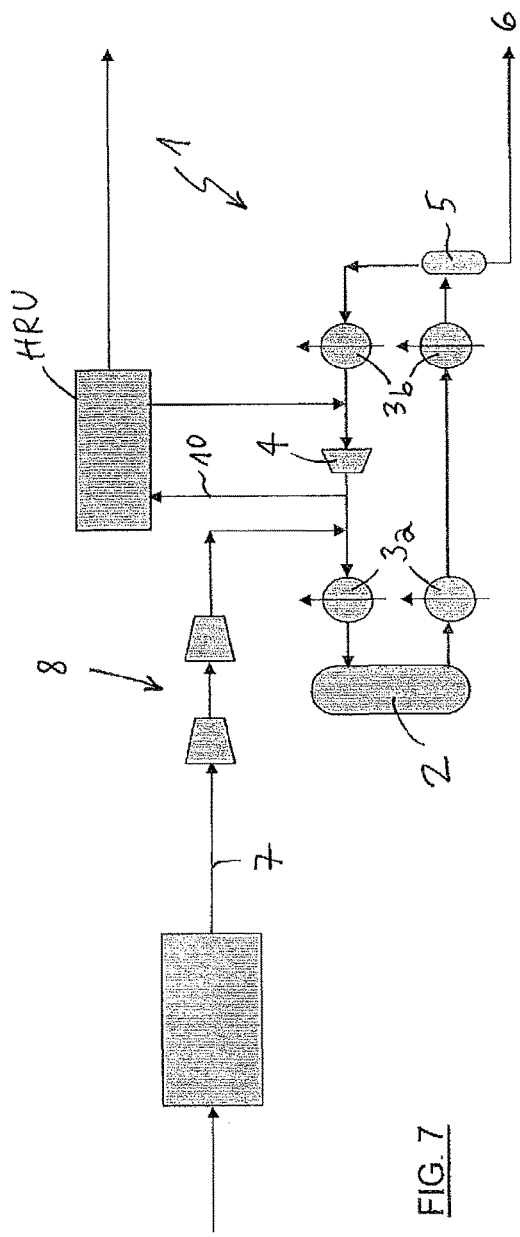
FIGS. 7 and 8 disclose two of possible arrangements of a recovery unit according to the invention.
Figure 8:
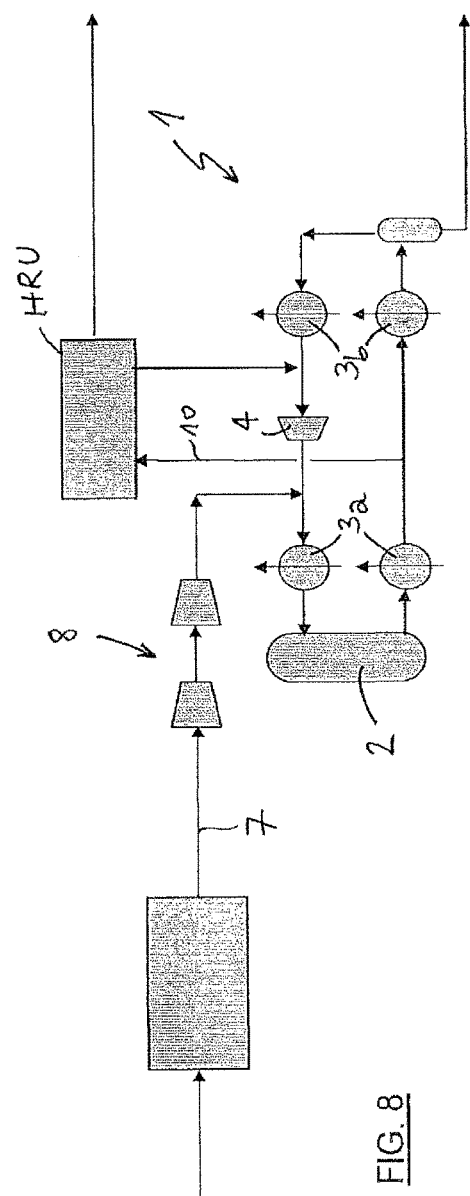

FIGS. 7 and 8 show general arrangement of a recovery unit according to the invention. The block HRU in FIGS. 6 and 7 comprises optionally devices for ammonia removal and drying, and a cryogenic unit according to the invention, such as any of the units 100, 200, 300, 400, 500 or 600 disclosed above. In FIG. 7, the recovery unit is connected across the circulator 4, i.e. the purge gas is taken at delivery side of the circulator 4, and the recycle stream is fed to the suction side of the same circulator. In FIG. 8, the loop 1 has hot heat exchangers 3a and cold heat exchangers 3b; the recovery unit is connected in parallel with the cold heat exchangers 3b, i.e. the purge gas 10 is taken downstream the converter 2.

The invention claimed is:

1. A process for recovering nitrogen and hydrogen contained in ammonia synthesis loop purge gas, taken from an ammonia synthesis loop and containing hydrogen and nitrogen, plus some methane and/or argon, wherein:
ammonia purge gas is extracted from an ammonia synthesis loop at a loop pressure; a purge gas feed is treated to remove ammonia and directed as an ammonia-free purge gas at loop pressure to a recovery unit for recovering at least part of its nitrogen and hydrogen content,
the process comprising the following steps:
cooling said ammonia-free purge gas feed at loop pressure to a cryogenic temperature, and partial liquefaction of methane and argon is achieved;
separating at least one gaseous stream containing hydrogen and nitrogen from the cooled purge gas feed in a plurality of phase separators arranged in a cascade of said recovery unit, said plurality comprising at least one first high pressure separator forming a high pressure separation section and at least a second separator operating at a pressure lower than said loop pressure, the second and any subsequent separator receiving a liquid outlet from a previous separator of said cascade; the recovery unit being able to export a recovery gaseous stream containing hydrogen and nitrogen at loop pressure, and at least another gaseous stream containing hydrogen and nitrogen at a lower pressure; and
reheating said gaseous stream containing hydrogen and nitrogen at loop pressure obtained at said separating step, and the so obtained reheated gaseous stream is exported from said recovery unit at loop pressure, and returned to the synthesis loop at loop pressure.

2. The process according to claim 1, wherein a liquid stream obtained by separation at said separating step is expanded in a plurality of expansion steps, separating one or more further gaseous streams containing hydrogen and nitrogen at a pressure lower than said loop pressure.

3. The process according to claim 1, wherein said separating step is carried out at a plurality of temperature levels, a gaseous stream being separated from said purge gas feed at a first temperature, said gaseous stream being then cooled and further separated into a gaseous fraction and a liquid fraction at least at another lower temperature.

4. The process according to claim 1, wherein the flow rate of said purge is such that the gas circulating in the ammonia synthesis loop has a concentration of argon and methane, not greater than 10 mol %, and wherein less than 50% of the nitrogen content of said purge gas is removed and more than 50% of the argon and methane content of said purge gas is removed.

5. The process according to claim 1, wherein one or more liquid streams obtained in the recovery unit is expanded in at least an expansion step, to provide at least part of net refrigeration to said recovery unit.

6. The process according to claim 1, wherein an argon-rich gaseous stream is also separated and exported from said recovery unit.

7. The process according to claim 1, wherein the loop pressure is in the range 50 to 500 bar, and said cryogenic temperature is in the range −230° C. to −130° C.

8. The process according to claim 5, wherein the one or more liquid streams is expanded by work-expanding the stream and mechanical energy/work is recovered by depressurizing through a turbine, expander, or valve.

9. The process according to claim 1, wherein the loop pressure is in the range 80 to 300 bar, and said cryogenic temperature is in the range −230° C. to −130° C.

\* \* \* \* \*